United States Patent
Ogawa et al.

(10) Patent No.: US 11,444,858 B2
(45) Date of Patent: Sep. 13, 2022

(54) DISCONNECTION MONITORING TERMINATING DEVICE AND DISCONNECTION MONITORING METHOD

(71) Applicant: Nippon Telegraph and Telephone Corporation, Tokyo (JP)

(72) Inventors: Muneaki Ogawa, Tokyo (JP); Kenjiro Arai, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/979,979

(22) PCT Filed: Mar. 7, 2019

(86) PCT No.: PCT/JP2019/009113
§ 371 (c)(1),
(2) Date: Sep. 11, 2020

(87) PCT Pub. No.: WO2019/176730
PCT Pub. Date: Sep. 19, 2019

(65) Prior Publication Data
US 2021/0367865 A1    Nov. 25, 2021

(30) Foreign Application Priority Data

Mar. 12, 2018  (JP) .............................. JP2018-043968

(51) Int. Cl.
*H04L 43/08* (2022.01)
*H04L 65/1069* (2022.01)
*H04L 65/65* (2022.01)

(52) U.S. Cl.
CPC .......... *H04L 43/08* (2013.01); *H04L 65/1069* (2013.01); *H04L 65/608* (2013.01)

(58) Field of Classification Search
CPC ... H04L 43/08; H04L 65/608; H04L 65/1069; H04L 43/0811; H04L 69/22; H04L 67/145; H04L 65/1006
See application file for complete search history.

(56) References Cited

U.S. PATENT DOCUMENTS 6,115,776 A *  9/2000  Reid ................. H04L 12/40032
                                                    709/230
6,735,288 B1 * 5/2004  Geen ................. H04L 29/06027
                                                    370/352

(Continued)

FOREIGN PATENT DOCUMENTS

JP        2003124967 A  *  4/2003

OTHER PUBLICATIONS

[No Author Listed]. "3rd Generation Partnership Project; Technical Specification Group Core Network and Terminals; Interworking between SIP-I based circuit-switched core network and other networks (Release 14)," 3GPP A Global Initiative, Mar. 2017, 109 pages.

(Continued)

*Primary Examiner* — Javier O Guzman
(74) *Attorney, Agent, or Firm* — Fish & Richardson P.C.

(57) ABSTRACT

It is possible to appropriately avoid erroneous call disconnection between interconnected networks at a low cost without modifying an apparatus in the network. A disconnection monitoring termination apparatus 1 is connected between a first network 100 for monitoring for inability to communicate RTP packets in a second network 200 by using a disconnection monitoring timer and the second network for accommodating terminals that do not send a hold signal, monitors for the inability to communicate the RTP packets in the second network 200 by using the disconnection monitoring timer for second network monitoring having a value smaller than a value of the disconnection monitoring (Continued)

timer of the first network 100, and when detecting the inability to communicate the RTP packets in the second network 200, the disconnection monitoring termination apparatus 1 sends an UPDATE request or a re-INVITE request including an SDP offer in which a direction attribute of "a=recvonly" is set, to the first network 100.

9 Claims, 10 Drawing Sheets

(56) References Cited

U.S. PATENT DOCUMENTS

| | | | | |
|---|---|---|---|---|
| 7,953,842 | B2* | 5/2011 | Dillon | H04L 67/10 709/224 |
| 8,984,067 | B2* | 3/2015 | Lau | H04L 65/1083 709/206 |
| 2004/0125757 | A1* | 7/2004 | Mela | H04L 65/103 370/261 |
| 2005/0083912 | A1* | 4/2005 | Afshar | H04L 65/4007 370/352 |
| 2005/0105471 | A1* | 5/2005 | Ido | H04L 47/14 370/241 |
| 2005/0213518 | A1* | 9/2005 | Ahya | H04L 65/1069 370/276 |
| 2007/0041357 | A1* | 2/2007 | Hoffmann | H04L 65/1006 370/352 |
| 2007/0223660 | A1* | 9/2007 | Dei | G10L 19/24 704/E19.044 |
| 2008/0043978 | A1* | 2/2008 | Lai | H04L 69/40 379/221.04 |
| 2008/0144630 | A1* | 6/2008 | Hayashida | H04W 76/32 370/395.1 |
| 2008/0298799 | A1* | 12/2008 | Takihiro | H04L 12/2861 398/2 |
| 2009/0070475 | A1* | 3/2009 | Handa | H04L 67/14 709/228 |
| 2011/0093542 | A1* | 4/2011 | Lau | H04L 65/1083 709/224 |
| 2011/0142103 | A1* | 6/2011 | Suzuki | H04L 65/608 375/211 |
| 2012/0015602 | A1* | 1/2012 | Murakami | H04B 7/155 455/7 |
| 2013/0034222 | A1* | 2/2013 | Li | H04L 65/1016 379/207.16 |
| 2016/0261643 | A1* | 9/2016 | Pettersson | H04L 65/608 |
| 2016/0373585 | A1* | 12/2016 | Sharma | H04W 76/25 |
| 2018/0014168 | A1* | 1/2018 | Lau | H04W 4/14 |
| 2018/0205401 | A1* | 7/2018 | Gabin | H04W 8/18 |
| 2020/0259873 | A1* | 8/2020 | Lindblad | H04W 80/10 |

OTHER PUBLICATIONS

[No Author Listed], "3rd Generation Partnership Project; Technical Specification Group Core Network and Terminals; IP Multimedia Subsystem (IMS) Application Level Gateway (IMS-ALG)-IMS Access Gateway (IMS-AGW) interface: Procedures descriptions (Release 14)," 3GPP A Global Initiative, Dec. 2017, 207 pages.

Handley et al., "SDP: Session Description Protocol," Network Working Group, Apr. 1998, 43 pages.

Rosenberg et al., "An Offer/Answer Model with the Session Description Protocol (SDP)." Network Working Group, Jun. 2002, 26 pages.

Rosenberg et al., "SIP: Session Initiation Protocol," Network Working Group, Jun. 2002, 270 pages.

* cited by examiner

DISCONNECTION MONITORING TERMINATING DEVICE AND DISCONNECTION MONITORING METHOD

CROSS-REFERENCE TO RELATED APPLICATIONS

This application is a National Stage application under 35 U.S.C. § 371 of International Application No. PCT/JP2019/009113, having an International Filing Date of Mar. 7, 2019, which claims priority to Japanese Application Serial No. 2018-043968, filed on Mar. 12, 2018. The disclosure of the prior application is considered part of the disclosure of this application, and is incorporated in its entirety into this application.

TECHNICAL FIELD

The present disclosure relates to a technique for monitoring for inability to communicate RTP packets (RTP disconnection monitoring technique).

BACKGROUND ART

In audio/video communication using Session Initiation Protocol (SIP, Non Patent Literature 1), a Session Description Protocol (SDP, Non Patent Literature 2) describing information on audio/video communication media is exchanged between source and destination terminals and SIP servers in networks to determine the conditions of audio/video media (media type, codec, packetization cycle, or the like), and actual transmission and reception of audio packets are performed using Real time Transport Protocol (RTP, Non Patent Literature 2).

The negotiation of the media information is performed by the source terminal describing the media information (audio/video, or the like) to be used for communication and various parameters (codec, packetization cycle, or the like) of the media in an SDP offer, and the destination terminal selecting media conditions to be used for communication from among the media conditions described in the SDP offer, describing the selected media condition in the SDP answer, and returning the SDP answer to the source terminal. Thus, the condition of the communication media is determined (Non Patent Literature 3).

Actual transmission and reception of audio packets are performed using RTP, but a case is assumed where RTP communication is not possible due to a failure of the U-plane apparatus (edge router or the like). When RTP communication is not possible, the disconnection signal (BYE request) is not transmitted from the destination terminal, the session is considered to be continuing, and the user of the source terminal is erroneously billed. To avoid erroneous billing, normally, a service provider network (a communication carrier network or the like) that provides audio/video communication using SIP has an RTP disconnection monitoring function of releasing a dialog when there is no RTP communication for a certain period of time.

Here, an outline of the functional operation of the RTP disconnection monitoring function is illustrated in FIG. 7. After completing the SDP offer and SDP answer, a C-plane apparatus 3a of a first network (source network) 100 and a C-plane apparatus 3b of a second network (destination network) 200 respectively give instructions and settings for starting RTP disconnection monitoring, to U-plane apparatuses 2a and 2b (S5, S7). Thus, the U-plane apparatuses 2a and 2b respectively monitor the communication of RTP packets in the opposing networks (200 and 100) (S9 and S10).

After that, when RTP communication is not possible in the second network 200 due to the failure of the U-plane apparatus 2b, after a certain period (time set in the disconnection monitoring timer) has elapsed from last reception of RTP packet from the opposite U-plane apparatus 2b, the U-plane apparatus 2a notifies the C-plane apparatus 3a of an RTP disconnection signal (S11). Upon receiving the notification of the RTP disconnection signal, the C-plane apparatus 3a transmits a BYE request to disconnect the call (release the dialog) (S12 to S14).

In 3GPP, the RTP disconnection monitoring function is defined as an option as "Media Inactivity Detection". Further, in Non Patent Literature 4, P-CSCF (IMS-ALG)/IMS-AGW is defined. In Non Patent Literature 5, IBCF (IMS-ALG)/TrGW is defined.

CITATION LIST

Non Patent Literature

Non Patent Literature 1: "SIP: Session Initiation Protocol", RFC3261
Non Patent Literature 2: "SDP: Session Description Protocol", RFC2327
Non Patent Literature 3: "An Offer/Answer Model with the Session Description Protocol (SDP)", RFC 3264
Non Patent Literature 4: "3rd Generation Partnership Project; Technical Specification Group Core Network and Terminals; IP Multimedia Subsystem (IMS) Application Level Gateway (IMS-ALG)—IMS Access Gateway (IMS-AGW) interface: Procedures descriptions (Release 14)", 3GPP TS 23.334 V14.4.0 (2017 December)
Non Patent Literature 5: "3rd Generation Partnership Project; Technical Specification Group Core Network and Terminals; Interworking between SIP—I based circuit-switched core network and other networks (Release 14)", 3GPP TS 29.235 V14.0.0 (2017 March)

SUMMARY OF THE INVENTION

Technical Problem

Problem 1

The RTP disconnection monitoring function is implemented based on a direction attribute ("a=") of media exchanged in an SDP offer/SDP answer. That is, when receiving an SDP in which the direction attribute of "a=sendonly" or "a=sendrecv" is set, the U-plane apparatus interprets that RTP packets are continuously sent from the transmission source of the SDP, and continues the disconnection monitoring of the RTP sent from the opposite U-plane apparatus, as long as the state of the direction attribute of the media is not changed, or the call is not disconnected. Further, reception of "a=inactive" means that media is not communicated, and thus, the U-plane apparatus does not start RTP disconnection monitoring or stops already started RTP monitoring.

However, as illustrated in FIG. 8, during RTP disconnection monitoring, the second network 200 does not send a signal indicating the suspension of media (for example, an UPDATE request in which "a=inactive" is set in the SDP offer) due to the suspension of media caused by a hold, and when the sending of media is stopped, there is no opportunity to detect a hold, so that there is a problem in that the U-plane apparatus 2a of the first network 100 disconnects the call after a lapse of a certain period of time in the disconnection monitoring timer.

Problem 2

Next, the RTP disconnection monitoring of the early media in the early stage will be described. Early media is media such as advance guidance provided to a source terminal before a call is established. As described in Problem 1, the RTP disconnection monitoring control is performed based on the direction attribute ("a=") of the SDP, but it is assumed that in the early stage, there is a network that stops the early media and controls the RTP disconnection monitoring by referring to the header information in the P-Early-Media header.

FIG. 9 illustrates an example in which a first network 100 that performs RTP disconnection monitoring control based on only the direction attribute ("a=") of the SDP and a second network 200 that stops early media using a P-Early-Media header and performs RTP disconnection monitoring control are interconnected. In the second network 200, to stop the sending of the early media, the media apparatus 5 transmits an UPDATE request that includes a P-Early-Media header in which "inactive" is set (SDP is not set), and stops the RTP disconnection monitoring (S11). However, the source network 100 does not support the P-Early-Media header, and there is no opportunity to detect media stoppage, so that there is a problem that the call is disconnected by the U-plane apparatus 2a, after a certain period of time has elapsed in the disconnection monitoring timer.

Problem 3

A disconnection monitoring timer for performing RTP disconnection monitoring can be freely set by a policy in the network such as VoIP. For example, in a mobile business operator, a relatively long-term RTP packet disconnection may occur even though the U-plane apparatus is normal, depending on the state of wireless communication.

FIG. 8 illustrates an example in which networks having different values of the disconnection monitoring timers are interconnected. The value of the disconnection monitoring timer of the first network 100 is set to 10 seconds, and the value of the disconnection monitoring timer of the second network 200 is set to 30 seconds. At this time, when RTP communication is temporarily disabled in the second network 200 having a long value of the disconnection monitoring timer, even if RTP communication may be restored within 30 seconds, there is a problem that the call is disconnected because the disconnection is detected in the first network 100 in which the disconnection monitoring timer is set to 10 seconds.

The present disclosure has been made in view of the above circumstances, and has as an objective to appropriately avoid erroneous call disconnection between interconnected networks at a low cost without modifying an apparatus in the network.

Means for Solving the Problem

In order to solve the above problems, a disconnection monitoring termination apparatus according to claim 1 being connected between a first network for monitoring for inability to communicate RTP packets in a second network by using a disconnection monitoring timer and the second network for accommodating terminals that do not send a hold signal, the disconnection monitoring termination apparatus including: a signal control unit configured to control signals transmitted and received between the first network and the second network; a disconnection monitoring timer storage unit configured to store a value of a disconnection monitoring timer for second network monitoring used for monitoring for the inability to communicate the RTP packets in the second network; a disconnection monitoring timer setting unit configured to set the value of the disconnection monitoring timer for second network monitoring to a value smaller than a value of the disconnection monitoring timer of the first network; and an RTP disconnection monitoring unit configured to monitor for the inability to communicate the RTP packets in the second network, by using the disconnection monitoring timer for second network monitoring, in which when the inability to communicate the RTP packets in the second network is detected, the signal control unit sends an UPDATE request or a re-INVITE request including an SDP offer in which a direction attribute of recvonly is set, to the first network.

A disconnection monitoring termination apparatus according to claim 2 is connected between a first network that monitors for the inability to communicate RTP packets in a second network based on the direction attribute of an SDP and the second network that stops the sending of the early media by setting inactive in a P-Early-Media header, and includes a signal control unit configured to control signals transmitted and received between the first network and the second network, in which when an UPDATE request including inactive in the P-Early-Media header does not include an SDP in which the direction attribute of inactive is set, the signal control unit generates an SDP in which the direction attribute of inactive is set and sends the SDP to the second network.

A disconnection monitoring termination apparatus according to claim 3 is connected between a first network and a second network that respectively monitor for inability to communicate RTP packets in the second network or the first network by respectively using disconnection monitoring timers having different values, the disconnection monitoring termination apparatus including: a signal control unit configured to control signals transmitted and received between the first network and the second network; a network disconnection monitoring timer storage unit configured to store a value of a disconnection monitoring timer held by the first network and a value of a disconnection monitoring timer held by the second network; a disconnection monitoring timer storage unit configured to store a value of a disconnection monitoring timer for monitoring both networks used for monitoring for inability to communicate RTP packets in both of the first network and the second network; a disconnection monitoring timer setting unit configured to set the value of the disconnection monitoring timer for monitoring both networks to a value smaller than the value of the disconnection monitoring timer held by the first network and the value of the disconnection monitoring timer held by the second network; and an RTP disconnection monitoring unit configured to monitor for the inability to communicate the RTP packets in each of the first network and the second network, by using the disconnection monitoring timer for monitoring both networks, in which when the inability to communicate the RTP packets is detected in one network having a larger value of the disconnection monitoring timer, of the first network and the second network, the signal control unit sends an UPDATE request or re-INVITE request in which a direction attribute of recvonly is set, to the other network.

A disconnection monitoring method according to claim 4 is a disconnection monitoring method executed by a disconnection monitoring termination apparatus, the disconnection monitoring termination apparatus being connected between a first network for monitoring for inability to communicate RTP packets in a second network by using a disconnection monitoring timer and the second network for accommodating terminals that do not send a hold signal, the disconnection monitoring method including: storing a value of a disconnection monitoring timer for second network monitoring used for monitoring for the inability to communicate the RTP packets in the second network, in a disconnection monitoring timer storage unit; setting the value of the disconnection monitoring timer for second network monitoring to a value smaller than a value of the disconnection monitoring timer of the first network; controlling signals transmitted and received between the first network and the second network; and monitoring for the inability to communicate the RTP packets in the second network, by using the disconnection monitoring timer for second network monitoring, in which while controlling the signals, when the inability to communicate the RTP packets in the second network is detected, an UPDATE request or a re-INVITE request including an SDP offer in which a direction attribute of recvonly is set is sent to the first network.

A disconnection monitoring method according to claim 5 is a disconnection monitoring method executed by a disconnection monitoring termination apparatus, the disconnection monitoring termination apparatus being connected between the first network that monitors for the inability to communicate RTP packets in the second network based on the direction attribute of an SDP and the second network that stops sending of the early media by setting inactive to a P-Early-Media header, and the disconnection monitoring method including: controlling signals transmitted and received between the first network and the second network, in which while controlling the signals, when an UPDATE request that includes inactive in the P-Early-Media header does not include an SDP in which the direction attribute of inactive is set, an SDP in which the direction attribute of inactive is set is generated and the SDP is sent to the second network.

A disconnection monitoring method according to claim 6 is a disconnection monitoring method executed by a disconnection monitoring termination apparatus, the disconnection monitoring termination apparatus being connected between a first network and a second network that respectively monitor for inability to communicate RTP packets in the second network or the first network by respectively using disconnection monitoring timers having different values, the disconnection monitoring method including: storing a value of a disconnection monitoring timer held by the first network and a value of a disconnection monitoring timer held by the second network, in a network disconnection monitoring timer storage unit; storing a value of a disconnection monitoring timer for monitoring both networks used for monitoring for inability to communicate RTP packets in both networks of the first network and the second network, in a disconnection monitoring timer storage unit; setting the value of the disconnection monitoring timer for monitoring both networks to a value smaller than the value of the disconnection monitoring timer held by the first network and the value of the disconnection monitoring timer held by the second network; controlling signals transmitted and received between the first network and the second network; and monitoring for the inability to communicate the RTP packets in each of the first network and the second network, by using the disconnection monitoring timer for monitoring both networks, in which while controlling the signals, when the inability to communicate RTP packets is detected in one network having a larger value of the disconnection monitoring timer, of the first network and the second network, an UPDATE request or re-INVITE request in which a direction attribute of recvonly is set is sent to the other network.

Effects of the Invention

According to the present disclosure, erroneous call disconnection between interconnected networks can be appropriately avoided at a low cost without modifying an apparatus in the network.

DESCRIPTION OF EMBODIMENTS

Hereinafter, embodiments of the present disclosure will be described with reference to the drawings.

It is assumed that there is a business network having various policies for RTP disconnection monitoring. Each business operator has already implemented RTP disconnection monitoring, it is actually impossible to unify policies between business operators or change policies for specific business operators, and Problems 1 to 3 occur. Thus, according to the present disclosure, Problems 1 to 3 are avoided at low cost without modifying an apparatus in the network.

First Embodiment

In a first embodiment, a method for solving Problem 1 will be described.

In the first embodiment, when interconnecting a first network with a second network which is a specific carrier network that accommodates terminals that do not send a hold signal, a disconnection monitoring termination apparatus corresponding to a C/U plane apparatus is newly introduced.

A disconnection monitoring termination apparatus sets the value of a disconnection monitoring timer for second network monitoring to be smaller than the value of a disconnection monitoring timer of the first network, and when detecting that the RTP packet cannot be communicated in the second network, the disconnection monitoring termination apparatus sends to the first network, an UPDATE request or a re-INVITE request having an SDP offer in which a direction attribute of "a=recvonly" is set. Thus, the direction attribute of the media is changed based on the request, so that a C-plane apparatus of the first network stops monitoring the disconnection of the media sent from the second network to the first network, for a U-plane apparatus in the first network.

Thereafter, when an RTP packet is received from the second network, the disconnection monitoring termination apparatus sends to the C-plane apparatus of the first network an UDPATE request or a re-INVITE request having an SDP offer in which a direction attribute of "a=sendrecv" is set. Thus, the direction attribute of the media is changed (returns to the original state), so that RTP disconnection monitoring is restarted by the U-plane apparatus of the first network.

Hereinafter, a specific example of the first embodiment will be described.

Figure 1:
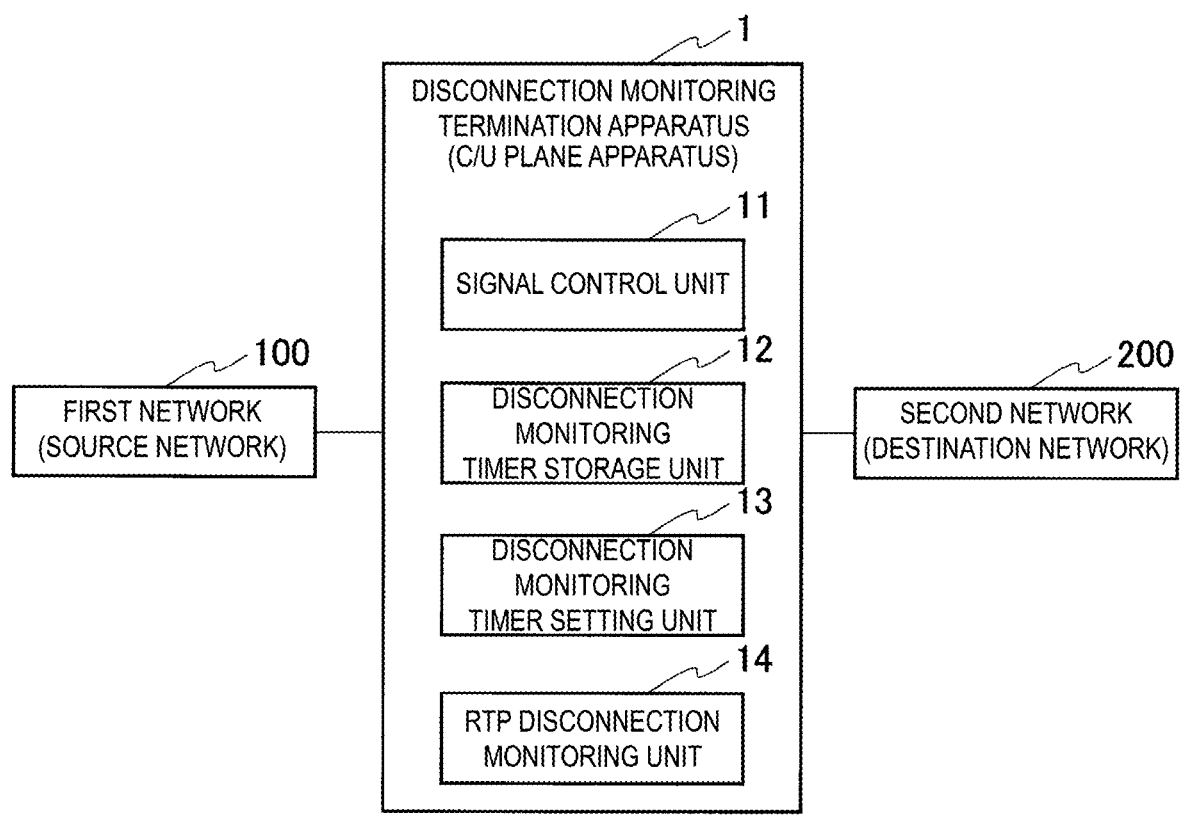
FIG. 1 is a diagram illustrating an overall configuration of a call processing system according to a first embodiment.
Figure 2:
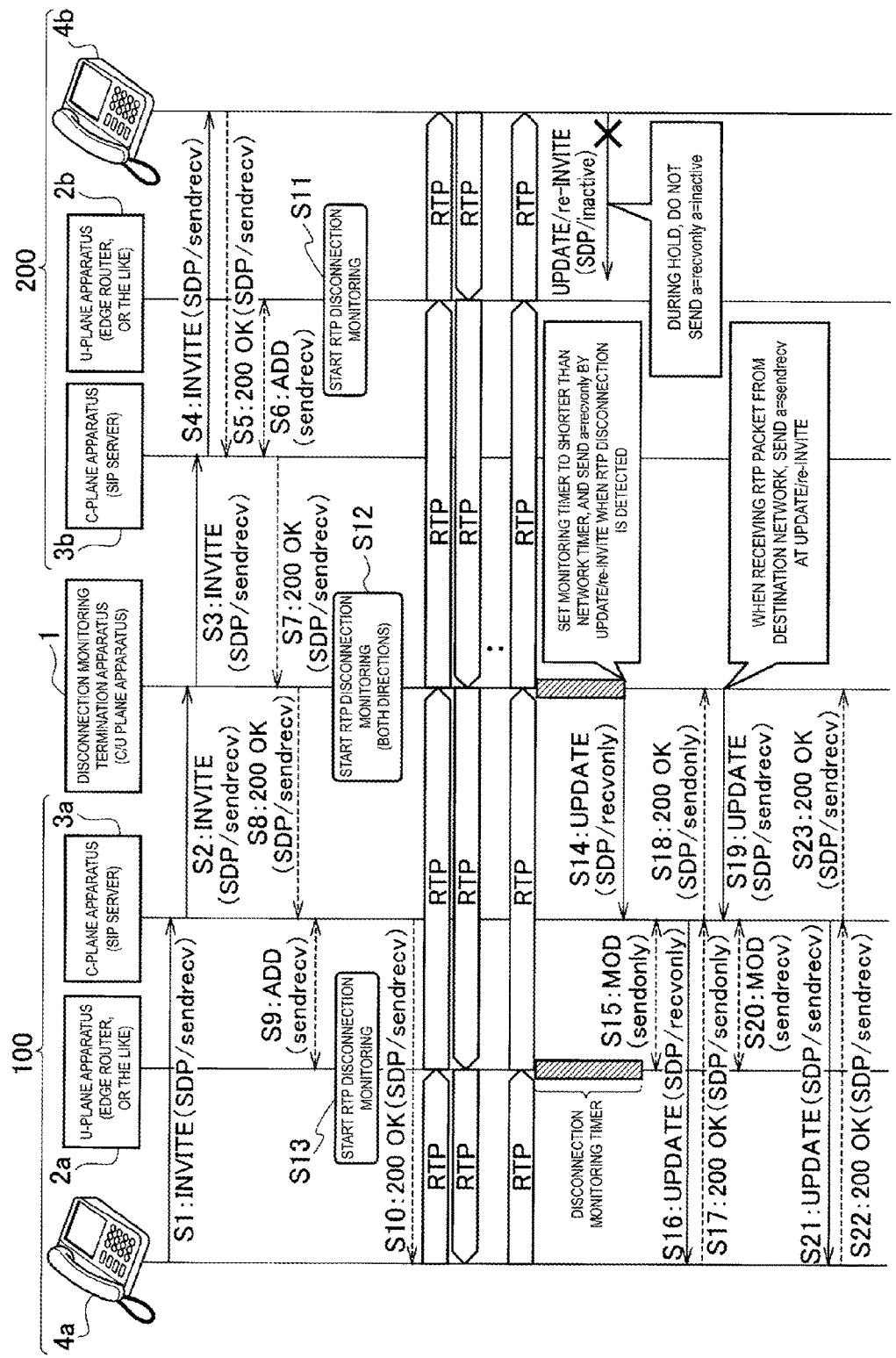
FIG. 2 is a diagram illustrating a processing sequence of the call processing system according to the first embodiment.

FIG. 1 is a diagram illustrating an overall configuration of a call processing system according to the first embodiment. FIG. 2 is a diagram illustrating a processing sequence of the call processing system according to the first embodiment. As illustrated in FIG. 1, the call processing system according to the present embodiment includes a first network 100, a second network 200, and a disconnection monitoring termination apparatus 1.

As illustrated in FIG. 2, the first network 100 includes a fixed telephone terminal 4a, a C-plane apparatus 3a such as a SIP server, and a U-plane apparatus 2a such as an edge router. The C-plane apparatus 3a is an apparatus that controls a call established by the fixed telephone terminal 4a with the fixed telephone terminal 4b of the second network 200. The U-plane apparatus 2a performs a process of transferring a call between the fixed telephone terminal 4a and the C-plane apparatus 3a, and has an RTP disconnection monitoring function for monitoring for the inability to communicate RTP packets in the second network 200, using the disconnection monitoring timer and the SDP direction attribute ("a=") held by the U-plane apparatus 2a.

The second network 200 has a similar configuration to that of the first network 100, but accommodates terminals that do not send a hold signal. The fixed telephone terminal 4b is a terminal that does not send a hold signal. As illustrated in FIG. 2, the second network 200 includes a C-plane apparatus 3b, a U-plane apparatus 2b, and a fixed telephone terminal 4b. The C-plane apparatus 3b is an apparatus that controls a call established by the fixed telephone terminal 4b with the fixed telephone terminal 4a of the first network 100. The U-plane apparatus 2b performs a process of transferring a call between the C-plane apparatus 3b and the fixed telephone terminal 4b, and has an RTP disconnection monitoring function for monitoring for the inability to communicate RTP packets in the first network 100, using the disconnection monitoring timer and the direction attribute ("a=") of the SDP held by the U-plane apparatus 2b.

The disconnection monitoring termination apparatus 1 is connected between the first network 100 and the second network 200 as illustrated in FIG. 1 and FIG. 2, performs a process of terminating calls transmitted and received between the first network 100 and the second network 200, and has an RTP disconnection monitoring function for monitoring for inability to communicate RTP packets in both networks of the first network 100 and the second network 200.

As illustrated in FIG. 1, the disconnection monitoring termination apparatus 1 includes, for example, a signal control unit 11, a disconnection monitoring timer storage unit 12, a disconnection monitoring timer setting unit 13, and an RTP disconnection monitoring unit 14.

The signal control unit 11 has a function of controlling signals transmitted and received between the first network 100 and the second network 200. The signal is, for example, a SIP signal or an RTP packet.

In addition, the signal control unit 11 has a function of sending to the first network 100, an UPDATE request or a re-INVITE request having an SDP offer in which a direction attribute of "a=recvonly" is set, when the inability to communicate RTP packets in the second network 200 is detected.

In addition, the signal control unit 11 has a function of sending to the first network 100, an UDPATE request or a re-INVITE request having an SDP offer in which a direction attribute of "a=sendrecv" is set, when receiving the RTP packet from the second network 200.

The disconnection monitoring timer storage unit 12 has a function of storing the value of the disconnection monitoring timer for first network monitoring used to monitor for the inability to communicate the RTP packets in the first network 100 and the value of the disconnection monitoring timer for second network monitoring used to monitor for the inability to communicate the RTP packets in the second network 200.

The disconnection monitoring timer setting unit 13 has a function of setting the value of the disconnection monitoring timer for second network monitoring to a value smaller than the value of the disconnection monitoring timer held by the first network 100. The disconnection monitoring timer of the first network 100 is a disconnection monitoring timer held by the U-plane apparatus 2b of the first network 100.

The RTP disconnection monitoring unit 14 has a function of monitoring for the inability to communicate RTP packets in the first network 100 by using the disconnection monitoring timer for first network monitoring, and monitoring for the inability to communicate RTP packets in the second network 200 by using the disconnection monitoring timer for second network monitoring.

Next, a processing operation (disconnection monitoring method) of the call processing system according to the first embodiment will be described with reference to FIG. 2.

Steps S1 to S10:

First, the fixed telephone terminal 4a of the first network 100 establishes a call connection with the fixed telephone terminal 4b of the second network 200 using an SIP signal. At this time, the disconnection monitoring termination apparatus 1 terminates the call between the first network 100 and the second network 200, and the signal control unit 11 of the disconnection monitoring termination apparatus 1 controls SIP signals transmitted and received between the first network 100 and the second network 200. Specifically, the signal control unit 11 transfers an INVITE request from the C-plane apparatus 3a of the first network 100 to the C-plane apparatus 3b of the second network 200 (S3), and transfers an OK response from the C-plane apparatus 3b to the C-plane apparatus 3a (S8).

Steps S11 to S13:

During or after the processing of steps S1 to S10, the C-plane apparatus 3b instructs the U-plane apparatus 2b to start RTP disconnection monitoring, based on the OK response (S5) from the fixed telephone terminal 4b (S6). Thus, the U-plane apparatus 2b starts monitoring for the inability to communicate RTP packets in the first network 100, using the disconnection monitoring timer held in the U-plane apparatus 2b (S11).

Further, the C-plane apparatus 3a instructs the U-plane apparatus 2a to start RTP disconnection monitoring, based on an OK response (S8) from the opposing C-plane apparatus 3b (actually, the disconnection monitoring termination apparatus 1) (S9). Thus, the U-plane apparatus 2a starts monitoring for the inability to communicate RTP packets in the second network 200, using the disconnection monitoring timer held in the U-plane apparatus 2b (S13).

Further, based on the OK response (S7) from the destination C-plane apparatus 3b, the RTP disconnection monitoring unit 14 of the disconnection monitoring termination apparatus 1 starts monitoring for the inability to communicate RTP packets in the first network 100 by using the value of the disconnection monitoring timer for first network monitoring, and starts monitoring for the inability to communicate RTP packets in the second network 200 by using the value of the disconnection monitoring timer for second network monitoring (S12). At this time, a value smaller than the value of the disconnection monitoring timer held by the first network 100 is set as the value of the disconnection monitoring timer for second network monitoring.

Step S14:

Thereafter, when the fixed telephone terminal 4b stops sending the media, without sending a signal (UPDATE request in which "a=inactive" is set in the SDP offer) indicating the suspension of the media, due to the suspension of media caused by a hold, the RTP disconnection monitoring unit 14 of the disconnection monitoring termination apparatus 1 detects inability to communicate RTP packets in the second network 200 before the first network 100, due to the passage of the value of the disconnection monitoring timer for second network monitoring. the inability to communicate RTP packets in the second network 200 is detected, so that the signal control unit 11 sends the first network 100 an UPDATE request or a re-INVITE request having an SDP offer in which a direction attribute of "a=recvonly" is set.

Step S15:

The media direction attribute is changed by the SDP offer in which a direction attribute of "a=recvonly" is set, so that the C-plane apparatus 3a of the first network 100 causes the U-plane apparatus 2a to stop the disconnection monitoring of media sent from the second network 200 to the first network 100 (the process of step S13).

Steps S16 to S19:

Thereafter, when receiving the RTP packet from the second network 200, the signal control unit 11 of the disconnection monitoring termination apparatus 1 sends to the first network 100 an UPDATE request or a re-INVITE request including the SDP offer in which the direction attribute of "a=sendrecv" is set.

Steps S20 to S23:

With the SDP offer in which the direction attribute of "a=sendrecv" is set, the direction attribute of the media is changed again (returns to the original state), so that the C-plane apparatus 3a of the first network 100 causes the U-plane apparatus 2a to resume disconnection monitoring of media transmitted from the second network 200 to the first network 100.

As described above, according to the first embodiment, the disconnection monitoring termination apparatus 1 is connected between the first network 100 that monitors for the inability to communicate RTP packets in the second network 200 by using the disconnection monitoring timer and the second network 200 that accommodates terminals that do not send a hold signal, and the disconnection monitoring termination apparatus 1 monitors for the inability to communicate RTP packets in the second network 200 by using the disconnection monitoring timer for second network monitoring having a value smaller than the value of the disconnection monitoring timer of the first network 100. Upon detecting the inability to communicate the RTP packets in the second network 200, the disconnection monitoring termination apparatus 1 sends to the first network 100, an UPDATE request or a re-INVITE request including an SDP offer in which the direction attribute of "a=recvonly" is set, so that erroneous call disconnection between interconnected networks can be appropriately avoided at a low cost without modifying an apparatus in the network.

Second Embodiment

In a second embodiment, a method for solving Problem 2 will be described.

In the second embodiment, when a first network that performs RTP disconnection monitoring control using only the direction attribute ("a=") of SDP and a second network that stops early media by setting inactive in the P-Early-Media header and performs RTP disconnection monitoring control based on the P-Early-Media header are interconnected, a disconnection monitoring termination apparatus is newly introduced.

In the early stage of giving advance guidance before establishing a call, when an UPDATE request including inactive in the P-Early-Media header does not include an SDP in which the direction attribute of "a=inactive" is set, the disconnection monitoring termination apparatus generates the SDP in which the direction attribute of "a=inactive" is set and sends the SDP to the first network. Thus, the disconnection monitoring of the early media in the first network can be stopped, and the disconnection of the call can be avoided.

Hereinafter, a specific example of the second embodiment will be described.

Figure 3:
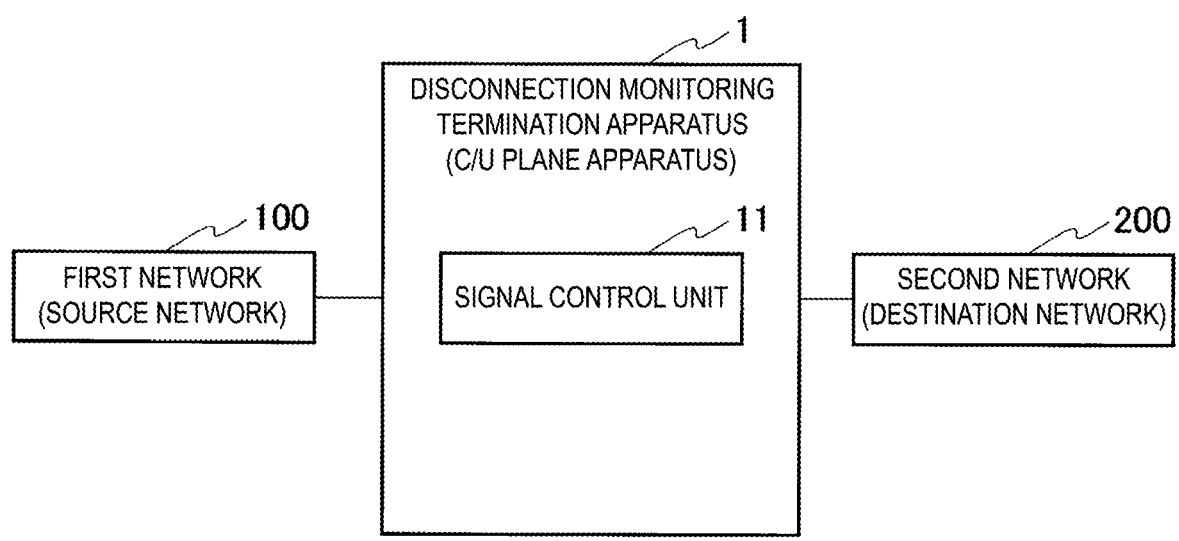
FIG. 3 is a diagram illustrating an overall configuration of a call processing system according to a second embodiment.
Figure 4:
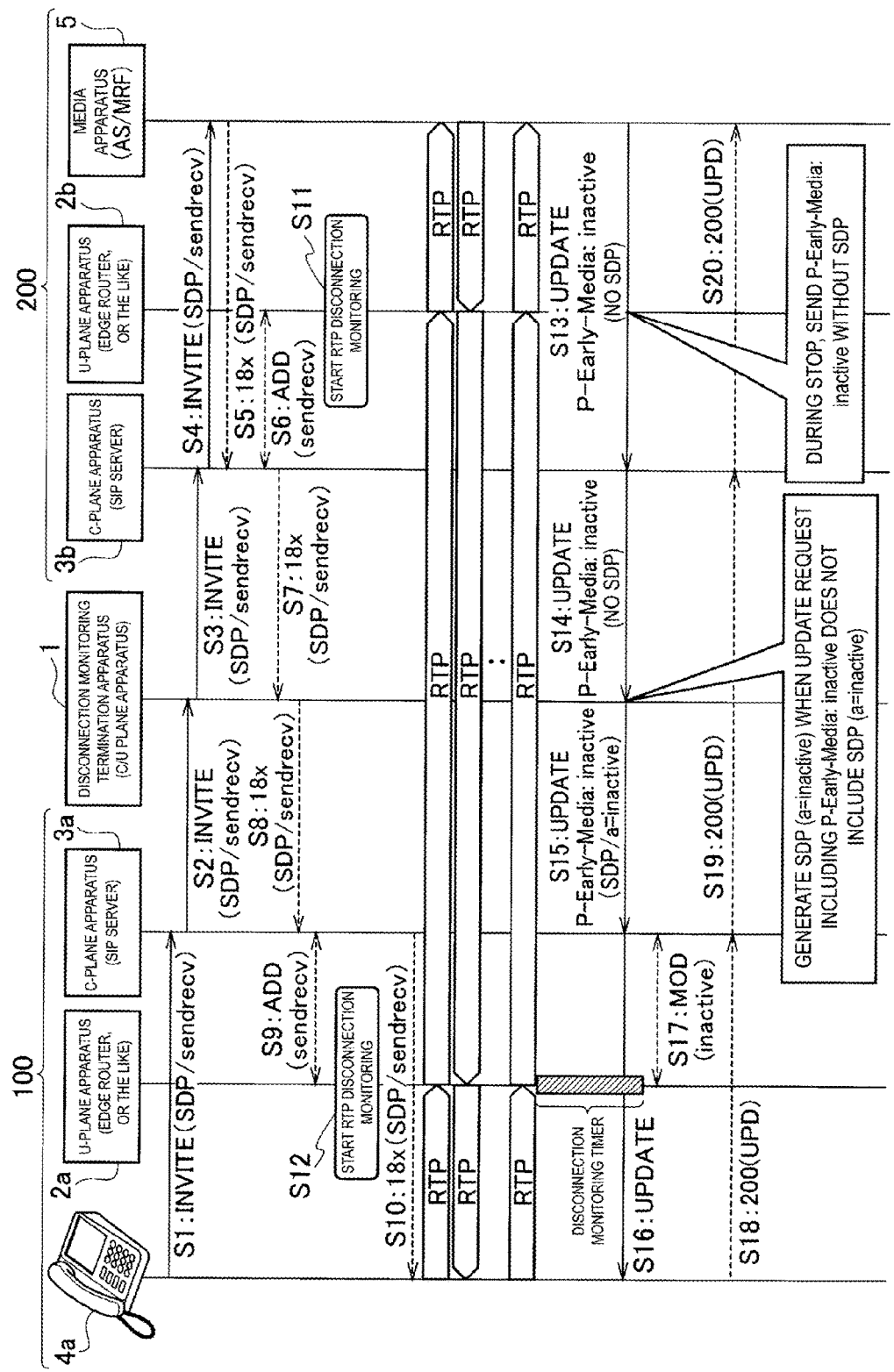
FIG. 4 is a diagram illustrating a processing sequence of the call processing system according to the second embodiment.

FIG. 3 is a diagram illustrating an overall configuration of a call processing system according to the second embodiment. FIG. 4 is a diagram illustrating a processing sequence of the call processing system according to the second embodiment. As illustrated in FIG. 3, the call processing system according to the present embodiment includes a first network 100, a second network 200, and a disconnection monitoring termination apparatus 1.

The first network 100 is a network that performs an RTP disconnection monitoring function using an SDP direction attribute ("a="). As illustrated in FIG. 4, the first network 100 includes a fixed telephone terminal 4a, a C-plane apparatus 3a, and a U-plane apparatus 2a. The U-plane apparatus 2a has an RTP disconnection monitoring function for monitoring for the inability to communicate RTP packets in the second network 200, using the disconnection monitoring timer and the SDP direction attribute ("a=") held by the U-plane apparatus 2a.

The second network 200 is a network that uses a P-Early-Media header to stop early media from being sent. As illustrated in FIG. 4, the second network 200 includes a C-plane apparatus 3b, a U-plane apparatus 2b, and a media apparatus 5. The media apparatus 5 is, for example, an Application Server (AP server) or a Media Resource Function (MRF) server. The U-plane apparatus 2b performs a process of transferring a call between the C-plane apparatus 3a and the media apparatus 5, stops early media from being sent based on inactive set in the P-Early-Media header, and has an RTP disconnection monitoring function of monitoring for the inability to communicate RTP packets in the first network 100 using the P-Early-Media header.

The disconnection monitoring termination apparatus 1 is provided with a signal control unit 11 as illustrated in FIG. 3.

The signal control unit 11 has a function of controlling signals transmitted and received between the first network 100 and the second network 200.

Further, when an UPDATE request including "inactive" in the P-Early-Media header does not include an SDP in which the direction attribute of "a=inactive" is set, the signal control unit 11 generates the SDP in which the direction attribute of "a=inactive" is set and sends the SDP to the second network 200.

Next, a process (disconnection monitoring method) of the call processing system according to the second embodiment will be described with reference to FIG. 4.

Steps S1 to S10:

First, the fixed telephone terminal 4a of the first network 100 establishes a call connection with the media apparatus 5 of the second network 200 using the SIP signal. At this time, the disconnection monitoring termination apparatus 1 terminates the call between the first network 100 and the second network 200, and the signal control unit 11 of the disconnection monitoring termination apparatus 1 controls SIP signals transmitted and received between the first network 100 and the second network 200. Specifically, the signal control unit 11 transfers an INVITE request from the C-plane apparatus 3a of the first network 100 to the C-plane apparatus 3b of the second network 200 (S3), and transfers an OK response from the C-plane apparatus 3b to the C-plane apparatus 3a (S8).

Step S11 and S12;

During or after the processing of steps S1 to S10, the C-plane apparatus 3b instructs the U-plane apparatus 2b to start RTP disconnection monitoring, based on the OK response (S5) from the media apparatus 5 (S6). Thus, the U-plane apparatus 2b starts monitoring for the inability to communicate RTP packets in the first network 100, using the disconnection monitoring timer held in the U-plane apparatus 2b (S11).

Further, the C-plane apparatus 3a instructs the U-plane apparatus 2a to start RTP disconnection monitoring, based on an OK response (S8) from the opposing C-plane apparatus 3b (actually, the disconnection monitoring termination apparatus 1) (S9). Thus, the U-plane apparatus 2a starts monitoring for the inability to communicate RTP packets in the second network 200, using the disconnection monitoring timer held in the U-plane apparatus 2b (S12).

Step S13:

Thereafter, when the media apparatus 5 transmits an UPDATE request (SDP is not set) that includes a P-Early-Media header in which "inactive" is set to stop early media, the U-plane apparatus 2b stops monitoring for the inability to communicate RTP packets in the first network 100, based on "inactive" set in the P-Early-Media header, and sends the received UPDATE request (SDP is not set) to the first network 100.

Step S15:

Further, the UPDATE request that includes "inactive" in the P-Early-Media header does not include an SDP in which the direction attribute of "a=inactive" is set, so that the signal control unit 11 of the disconnection monitoring termination apparatus 1 generates an SDP in which the direction attribute of "a=inactive" is set and sends the SDP to the first network 100.

Steps S16 to S22;

Thereafter, the C-plane apparatus 3a of the first network 100 causes the U-plane apparatus 2a to stop the disconnection monitoring (the process of step S12) of media sent from the second network 200 to the first network 100 (S16), based on the direction attribute of "a=inactive" set in the SDP.

As described above, according to the second embodiment, the disconnection monitoring termination apparatus 1 is connected between the first network 100 that monitors for the inability to communicate RTP packets in the second network 200 based on the SDP direction attribute ("a=") and the second network 200 that stops the sending of the early media by setting inactive to the P-Early-Media header and performs the RTP disconnection monitoring control, and when the UPDATE request including inactive in the P-Early-Media header does not include an SDP in which the direction attribute of "a=inactive" is set, the disconnection monitoring termination apparatus 1 generates an SDP in which the direction attribute of "a=inactive" is set and sends the SDP to the second network, so that erroneous call disconnection between interconnected networks can be appropriately avoided at a low cost without modifying an apparatus in the network.

Third Embodiment

In a third embodiment, a method for solving Problem 3 will be described.

In the third embodiment, when a first network and a second network having different values of the disconnection monitoring timer are interconnected, a disconnection monitoring termination apparatus is newly introduced.

The disconnection monitoring termination apparatus stores in advance the values of the disconnection monitoring timers of the interconnected first and second networks. For example, the disconnection monitoring termination apparatus stores in advance that the value of the network monitoring timer of the first network is 10 seconds and the value of the network monitoring timer of the second network is 30 seconds. Then, the disconnection monitoring termination apparatus sets its own disconnection monitoring timer to a value smaller than the minimum value of each of the disconnection monitoring timers of the first network and the second network, and performs RTP disconnection monitoring in each network.

Thus, the disconnection monitoring termination apparatus can detect a RTP disconnection in each network before the RTP disconnection detection is performed in both networks, and when a RTP disconnection is detected for media from the second network having a long disconnection monitoring timer, an UPDATE request or a re-INVITE request in which the direction attribute of "a=recvonly" is set is sent to the first network.

This changes the direction attribute of the media, so that the C-plane apparatus of the first network stops monitoring for the disconnection of media sent from the second network to the first network, for the U-plane apparatus of the first network. This enables call disconnection to be avoided up to 30 seconds which is the value of the longer disconnection monitoring timer.

Further, when an RTP packet is received from the second network, as in the first embodiment, the disconnection monitoring termination apparatus sends to the C-plane apparatus of the first network an UPDATE request or a re-INVITE request in which the direction attribute of "a=sendrecv" is set. Thus, the RTP disconnection monitoring in the C-plane apparatus can be restarted.

Hereinafter, a specific example of the third embodiment will be described.

Figure 5:
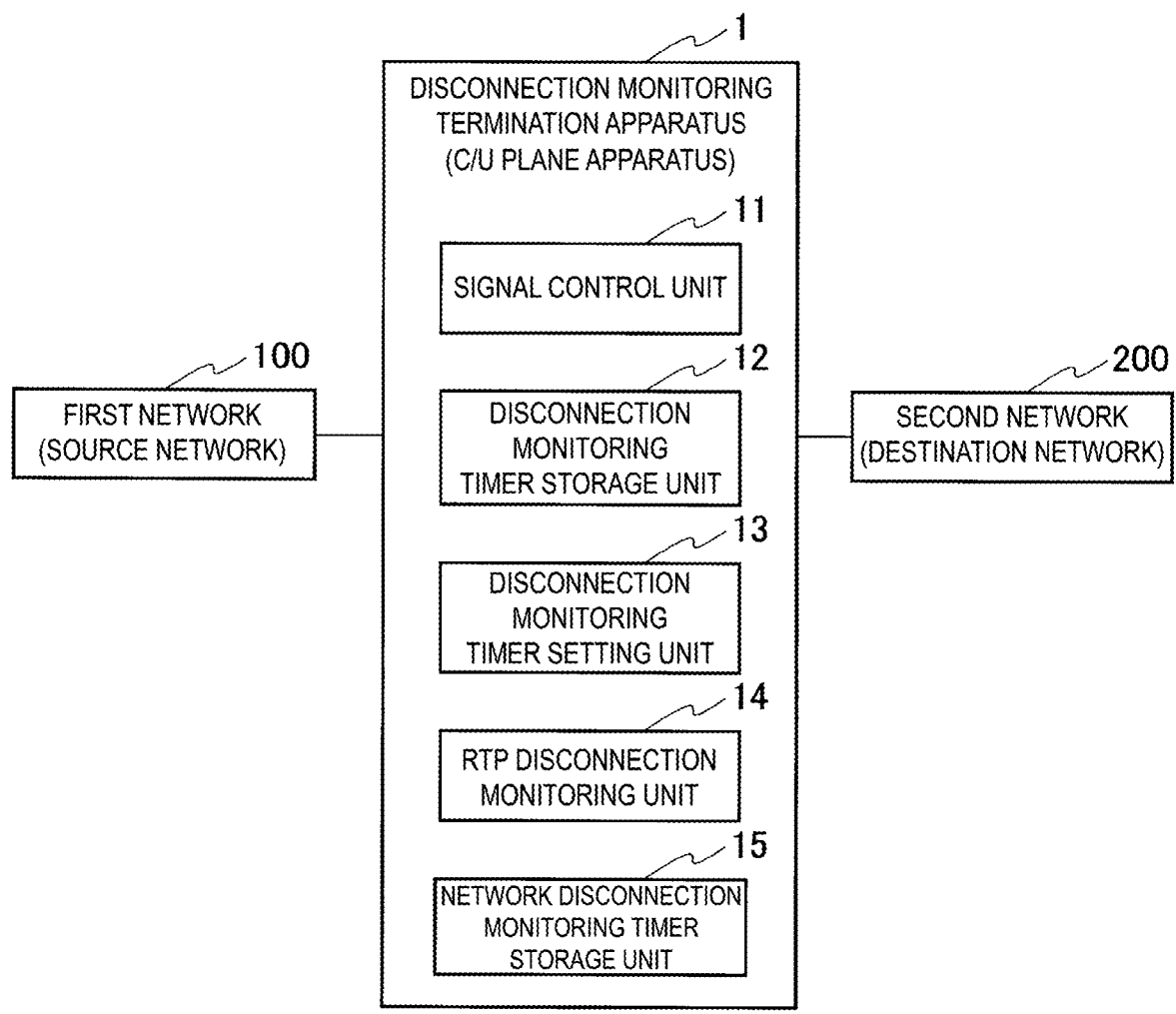
FIG. 5 is a diagram illustrating an overall configuration of a call processing system according to a third embodiment.
Figure 6:
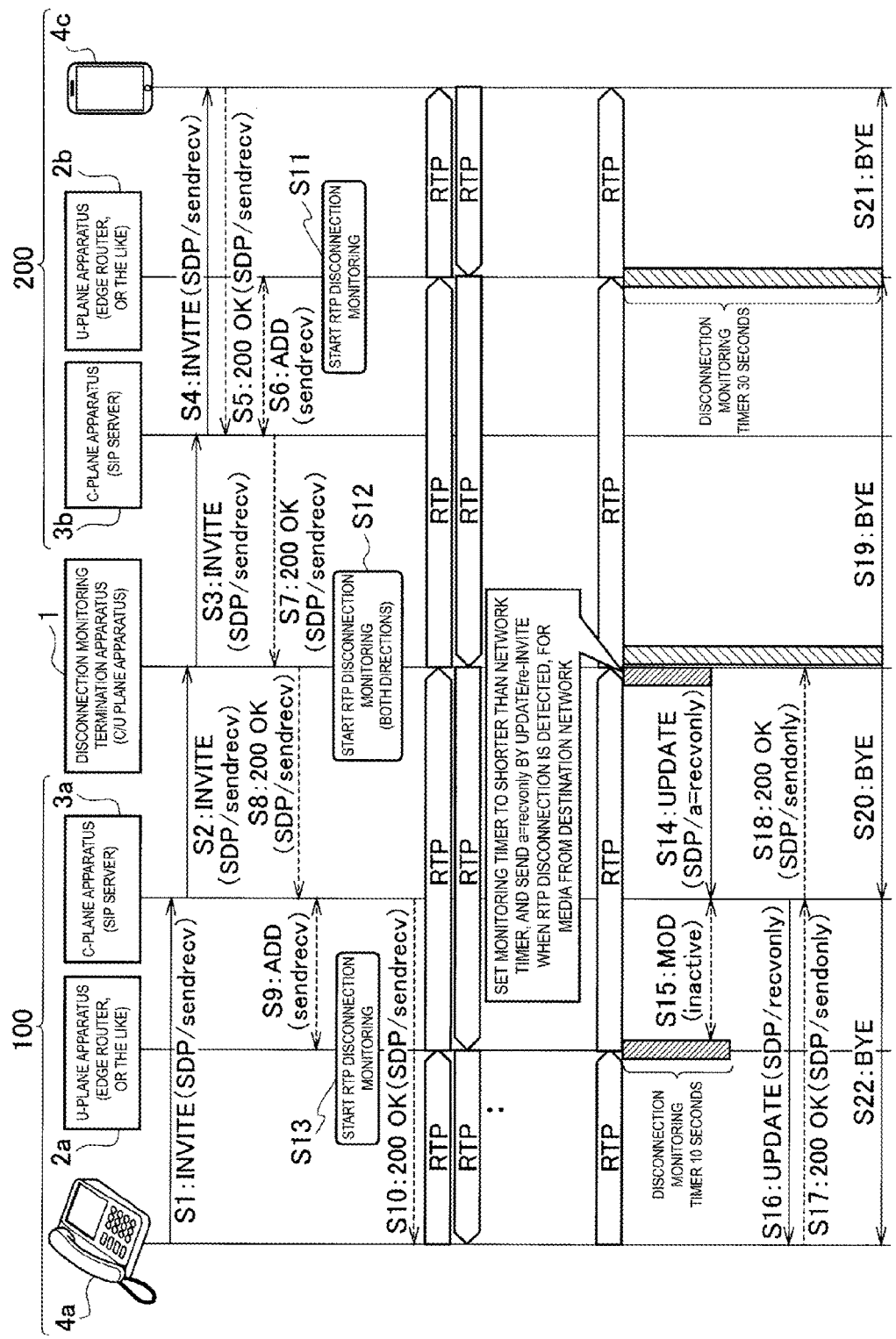
FIG. 6 is a diagram illustrating a processing sequence of the call processing system according to the third embodiment.
Figure 7:
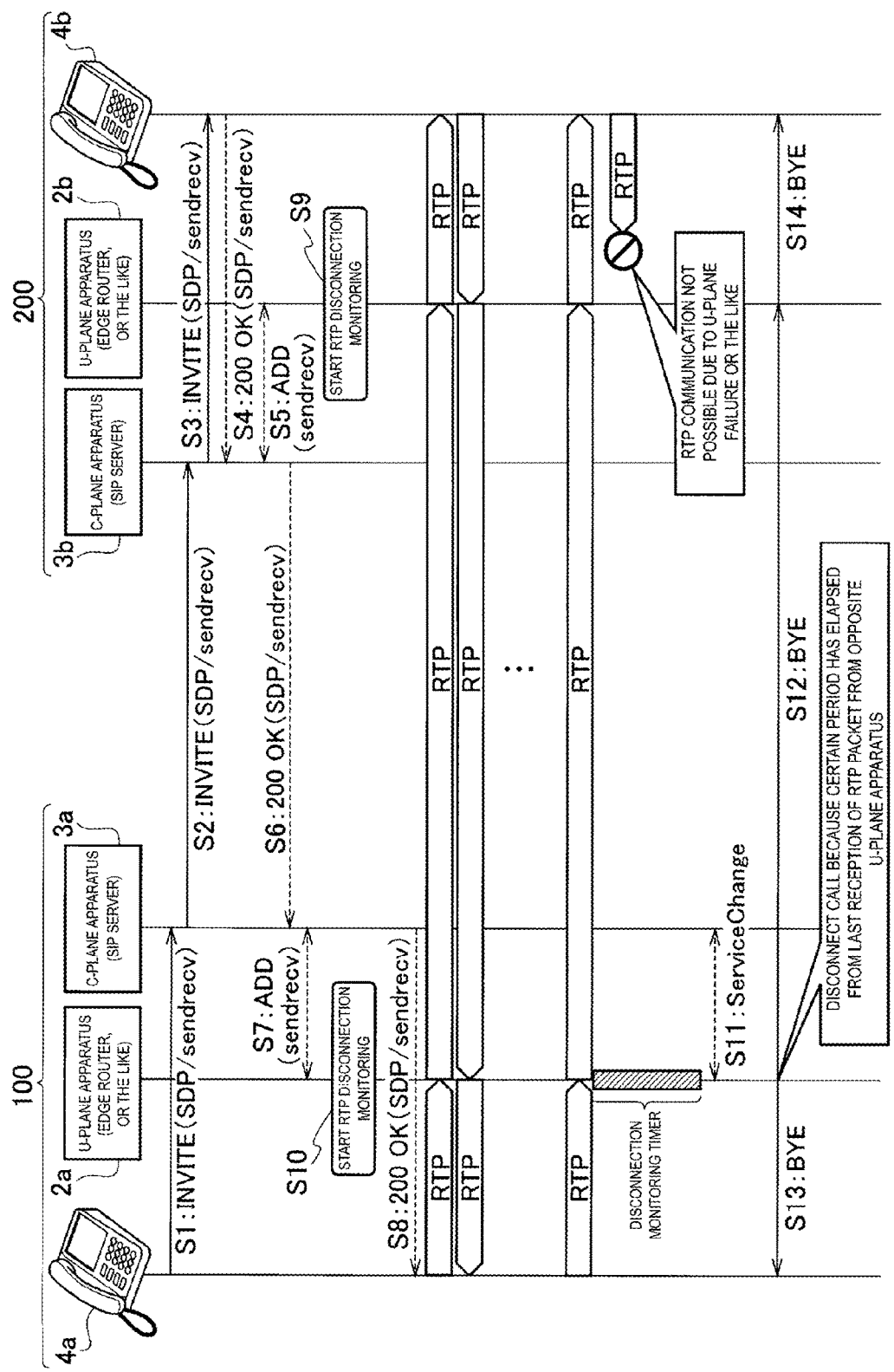
FIG. 7 is a diagram illustrating an outline of the functional operation of an RTP disconnection monitoring function.
Figure 8:
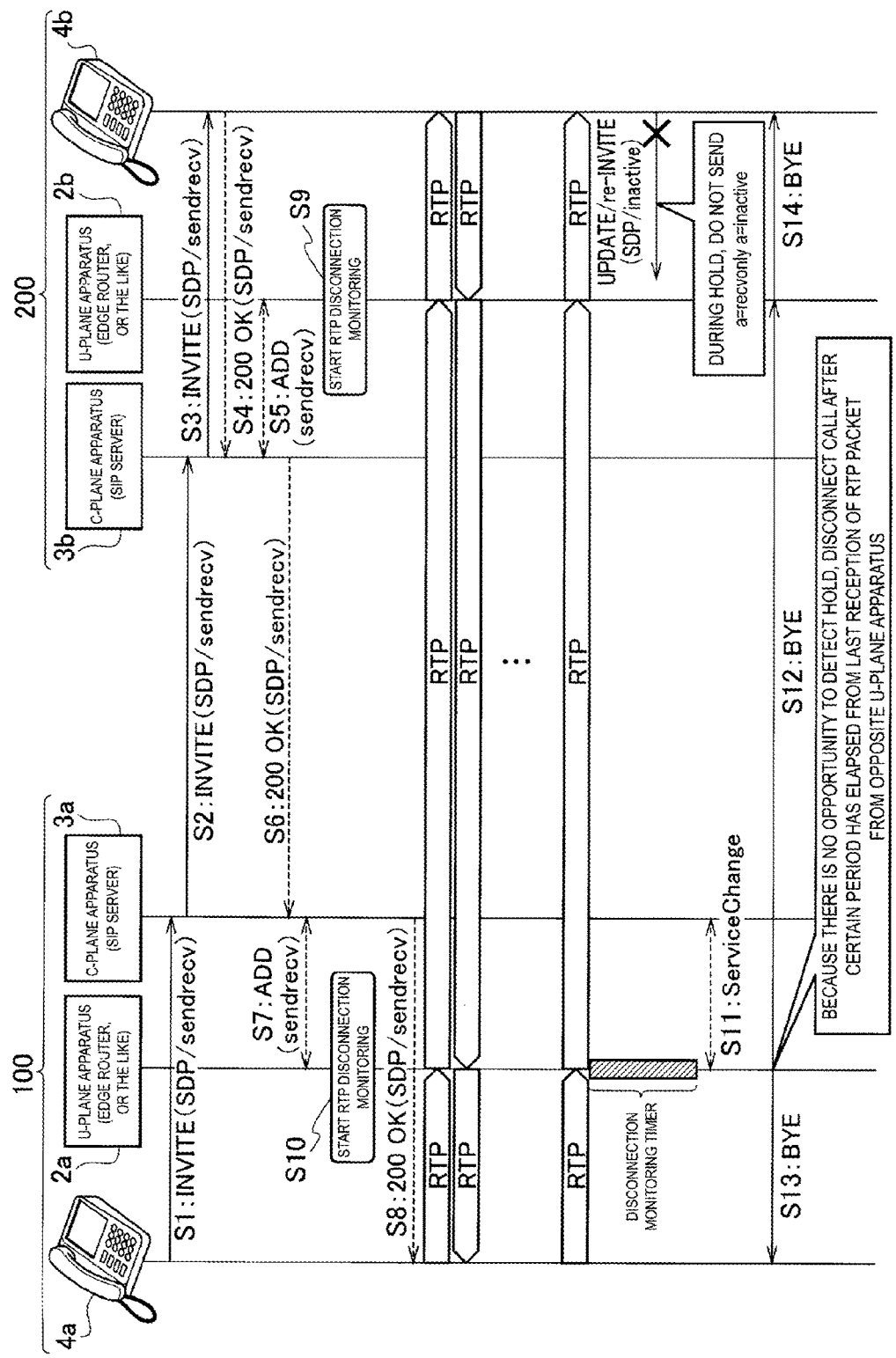
FIG. 8 is a diagram illustrating interconnection with a network accommodating terminals that do not send a hold signal.
Figure 9:
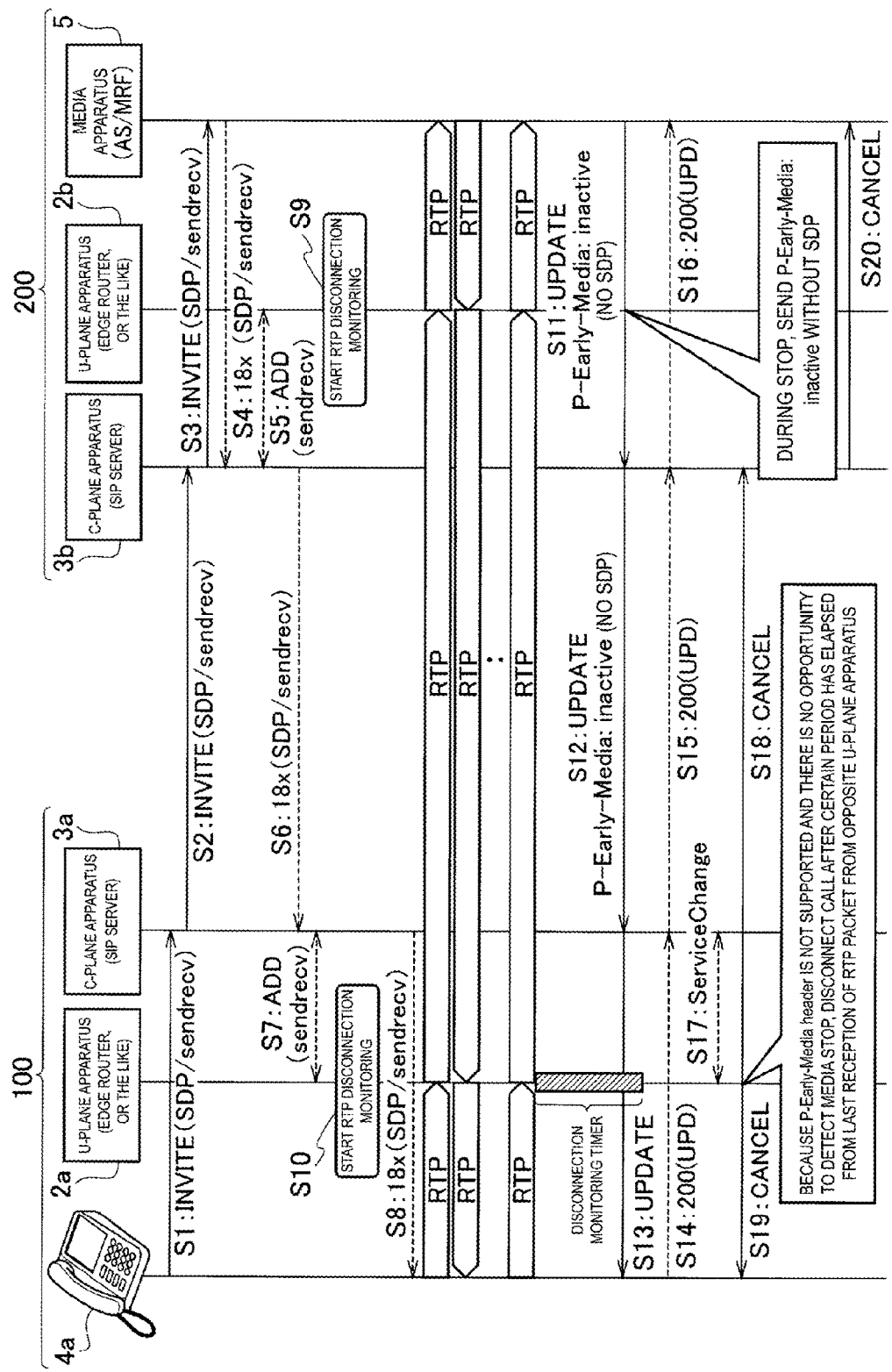
FIG. 9 is a diagram illustrating a connection with a network that does not support a P-Early-Media header.
Figure 10:
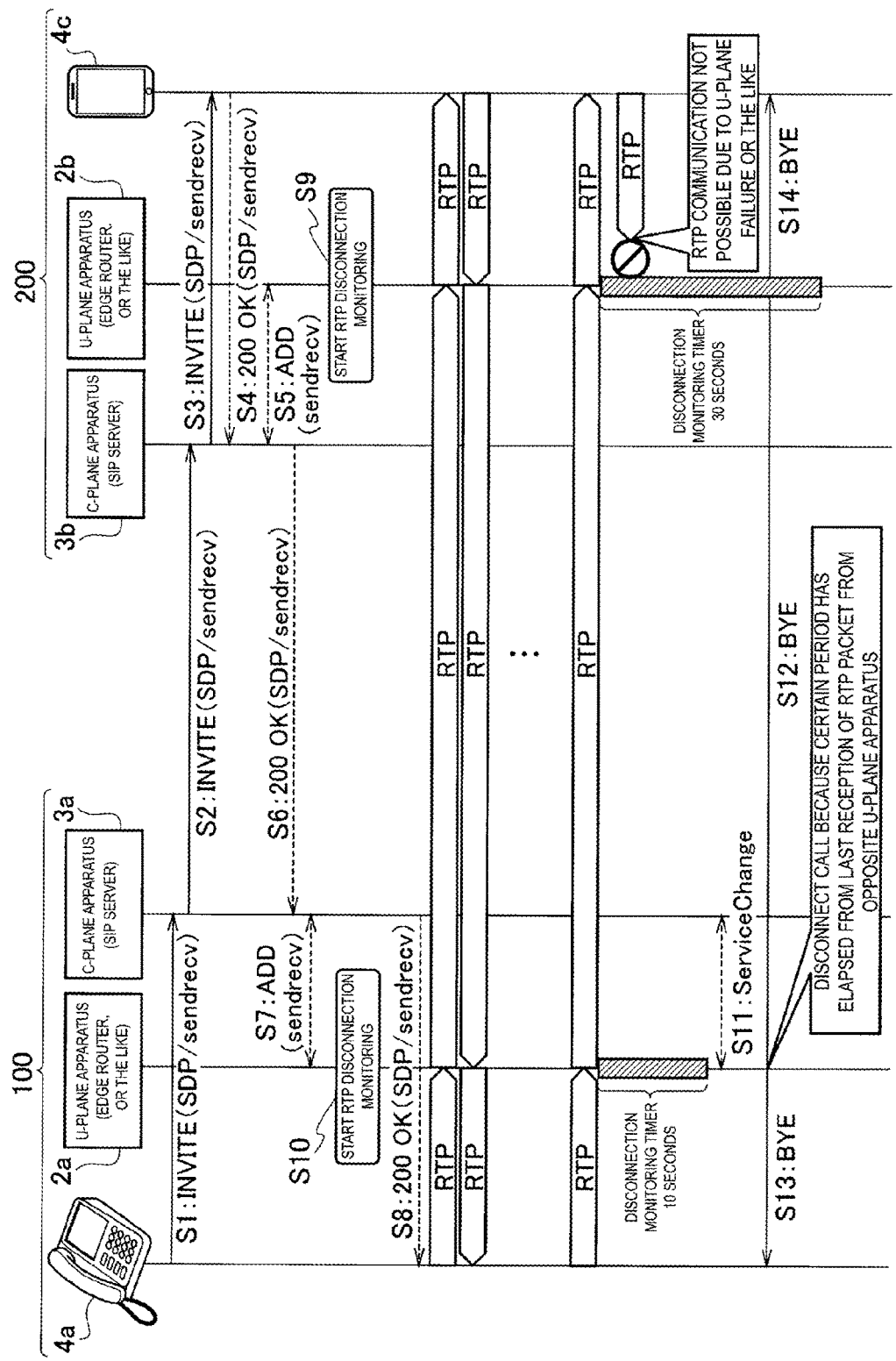
FIG. 10 is a diagram illustrating interconnection with a network having a different value of a disconnection monitoring timer.

FIG. 5 is a diagram illustrating an overall configuration of a call processing system according to the third embodiment. FIG. 6 is a diagram illustrating a processing sequence of the call processing system according to the third embodiment. As illustrated in FIG. 5, the call processing system according to the present embodiment includes a first network 100, a second network 200, and a disconnection monitoring termination apparatus 1.

As illustrated in FIG. 6, the first network 100 includes a fixed telephone terminal 4a, a C-plane apparatus 3a such as a SIP server, and a U-plane apparatus 2a such as an edge router. The U-plane apparatus 2a has an RTP disconnection monitoring function of monitoring for the inability to communicate RTP packets in the second network 200, using a disconnection monitoring timer whose value is set to 10 seconds.

As illustrated in FIG. 6, the second network 200 includes a C-plane apparatus 3b, a U-plane apparatus 2b, and a smart terminal 4c. Examples of the smart terminal 4c include a smartphone terminal, a tablet terminal having a telephone function, or the like. The U-plane apparatus 2b has an RTP disconnection monitoring function of monitoring for the inability to communicate RTP packets in the first network 100, using a disconnection monitoring timer whose value is set to 30 seconds.

As illustrated in FIG. 5, the disconnection monitoring termination apparatus 1 includes, for example, a signal control unit 11, a disconnection monitoring timer storage unit 12, a disconnection monitoring timer setting unit 13, an RTP disconnection monitoring unit 14, and a network disconnection monitoring timer storage unit 15.

The signal control unit 11 has a function of controlling signals transmitted and received between the first network 100 and the second network 200.

In addition, the signal control unit 11 has a function of sending to the first network 100, an UPDATE request or a re-INVITE request in which a direction attribute of "a=recvonly" is set, when detecting the inability to communicate RTP packets in the second network 200 of which the value of the disconnection monitoring timer is larger among the first network 100 and the second network 200.

The network disconnection monitoring timer storage unit 15 has a function of storing the value (10 seconds) of the disconnection monitoring timer held by the first network 100 and the value (30 seconds) of the disconnection monitoring timer held by the second network 200. The value of the disconnection monitoring timer of each network (100, 200) may be received by the disconnection monitoring termination apparatus 1 from each network, or may be set manually by the administrator of the disconnection monitoring termination apparatus 1 after confirming by hearing from the administrator of each network.

The disconnection monitoring timer storage unit 12 has a function of storing values of disconnection monitoring timers for monitoring both networks used to respectively monitor for the inability to communicate RTP packets in both networks of the first network 100 and the second network 200.

The disconnection monitoring timer setting unit 13 has a function of setting the value of the disconnection monitoring timer for monitoring both networks to a value smaller than the value of the disconnection monitoring timer held by the first network 100 and the value of the disconnection monitoring timer held by the second network 200.

The RTP disconnection monitoring unit 14 has a function of monitoring for respective inability to communicate RTP packets between the first network 100 and the second network 200 using a disconnection monitoring timer for monitoring both networks.

Next, a processing operation (disconnection monitoring method) of the call processing system according to the third embodiment will be described with reference to FIG. 6.

Steps S1 to S10:

First, the fixed telephone terminal 4a of the first network 100 establishes a call connection with the smart terminal 4c of the second network 200 using the SIP signal. At this time, the disconnection monitoring termination apparatus 1 terminates the call between the first network 100 and the second network 200, and the signal control unit 11 of the disconnection monitoring termination apparatus 1 controls SIP signals transmitted and received between the first network 100 and the second network 200. Specifically, the signal control unit 11 transfers an INVITE request from the C-plane apparatus 3a of the first network 100 to the C-plane apparatus 3b of the second network 200 (S3), and transfers an OK response from the C-plane apparatus 3b to the C-plane apparatus 3a (S8).

Steps S11 to S13:

During or after the processing of steps S1 to S10, the C-plane apparatus 3b instructs the U-plane apparatus 2b to start RTP disconnection monitoring, based on the OK response (S5) from the smart terminal 4c (S6). Thus, the U-plane apparatus 2b starts monitoring for the inability to communicate RTP packets in the first network 100, using the disconnection monitoring timer (value=30 seconds) held in the U-plane apparatus 2b (S11).

Further, the C-plane apparatus 3a instructs the U-plane apparatus 2a to start RTP disconnection monitoring, based on an OK response (S8) from the opposing C-plane apparatus 3b (actually, the disconnection monitoring termination apparatus 1) (S9). Thus, the U-plane apparatus 2a starts monitoring for the inability to communicate RTP packets in the second network 200, using the disconnection monitoring timer (value=10 seconds) held in the U-plane apparatus 2a (S13).

Further, the RTP disconnection monitoring unit 14 of the disconnection monitoring termination apparatus 1 starts monitoring for the inability to communicate RTP packets in each of the first network 100 and the second network 200, using the disconnection monitoring timer for monitoring both networks (value=8 seconds), based on the OK response (S7) from the destination C-plane apparatus 3b (S12).

Step S14:

After that, after eight seconds elapse from no transmission of RTP packets from the second network 200 to the first network 100, when the disconnection monitoring termination apparatus 1 detects the inability to communicate RTP packets in the second network 200, the signal control unit 11 of the disconnection monitoring termination apparatus 1 sends to the first network 100, an UPDATE request or a re-INVITE request in which a direction attribute of "a=recvonly" is set.

Steps S15 to S22;

The media direction attribute is changed by the UPDATE request or re-INVITE request in which a direction attribute of "a=recvonly" is set, so that the C-plane apparatus 3a of the first network 100 causes the U-plane apparatus 2a to stop the disconnection monitoring of media sent from the second network 200 to the first network 100 (the process of step S13) (S15). This enables call disconnection to be avoided up to 30 seconds as the longer timer.

As described above, according to the third embodiment, the disconnection monitoring termination apparatus 1 is connected between the first network 100 and the second network 200 that respectively monitor for the inability to communicate RTP packets in the second network or the first network by respectively using disconnection monitoring timers having different values, the disconnection monitoring termination apparatus 1 monitors for the inability to communicate RTP packets in each of the first network 100 and the second network 200, by using the disconnection monitoring timer for monitoring both networks, having a value smaller than the value of the disconnection monitoring timer held by the first network 100 and the value of the disconnection monitoring timer held by the second network 200, and when the inability to communicate RTP packets is detected in one network having a large value of the disconnection monitoring timer, among the first network 100 and the second network 200, the disconnection monitoring termination apparatus 1 sends the UPDATE request or re-INVITE request in which a direction attribute of "a=recvonly" is set, to the other network, so that erroneous call disconnection between interconnected networks can be appropriately avoided at a low cost without modifying an apparatus in the network.

Finally, the disconnection monitoring termination apparatus 1 described in the present embodiment can be realized by a computer. It is also possible to create a program for causing a computer to function as the disconnection monitoring termination apparatus 1 and a storage medium for the program.

REFERENCE SIGNS LIST

1: Disconnection monitoring termination apparatus
11: Signal control unit
12: Disconnection monitoring timer storage unit
13: Disconnection monitoring timer setting unit
14: RTP disconnection monitoring unit
15: Network disconnection monitoring timer storage unit
100: First network (source network)
2a: U-plane apparatus
3a: C-plane apparatus
4a: Fixed telephone terminal
200: Second network (destination network)
2b: U-plane apparatus
3b: C-plane apparatus
4b: Fixed telephone terminal
4c: Smart terminal
5: Media apparatus

The invention claimed is:

1. A disconnection monitoring termination apparatus operable to be connected between a first network configured to monitor for inability to communicate real time transport protocol (RTP) packets in a second network by using a disconnection monitoring timer and the second network configured to accommodate terminals that do not send a hold signal, the disconnection monitoring termination apparatus comprising:
a signal control unit, implemented using one or more computing devices, configured to control a signal transmitted and received between the first network and the second network;
a disconnection monitoring timer storage unit, implemented using one or more computing devices, configured to store a value of a disconnection monitoring timer for second network monitoring used for monitoring for the inability to communicate the RTP packets in the second network;
a disconnection monitoring timer setting unit, implemented using one or more computing devices, configured to set the value of the disconnection monitoring timer for second network monitoring to a value smaller than a value of the disconnection monitoring timer of the first network; and
an RTP disconnection monitoring unit, implemented using one or more computing devices, configured to monitor for the inability to communicate the RTP packets in the second network, by using the disconnection monitoring timer for second network monitoring,
wherein the signal control unit is configured to, based on the RTP disconnection monitoring unit detecting the inability to communicate the RTP packets in the second network, send a request including a session description protocol (SDP) offer in which a direction attribute of receive only is set, to the first network.

2. A disconnection monitoring method executed by a disconnection monitoring termination apparatus, the disconnection monitoring termination apparatus operable to be connected between a first network configured to monitor for inability to communicate real time transport protocol (RTP) packets in a second network by using a disconnection monitoring timer and the second network configured to accommodate terminals that do not send a hold signal, the disconnection monitoring method comprising:
storing a value of a disconnection monitoring timer for second network monitoring used for monitoring for the inability to communicate the RTP packets in the second network, in a disconnection monitoring timer storage unit;
setting the value of the disconnection monitoring timer for second network monitoring to a value smaller than a value of the disconnection monitoring timer of the first network;
controlling a signal transmitted and received between the first network and the second network; and
monitoring, by an RTP disconnection monitoring unit implemented in the disconnection monitoring termination apparatus, for the inability to communicate the RTP packets in the second network, by using the disconnection monitoring timer for second network monitoring,
wherein, while controlling the signal, based on the RTP disconnection monitoring unit detecting inability to communicate the RTP packets in the second network, a request including a session description protocol (SDP) offer in which a direction attribute of receive only set is sent to the first network.

3. A disconnection monitoring method executed by a disconnection monitoring termination apparatus, the disconnection monitoring termination apparatus operable to be connected between a first network and a second network that are respectively configured to monitor for inability to communicate real time transport protocol (RTP) packets in the second network or the first network by respectively using disconnection monitoring timers having different values, the disconnection monitoring method comprising:
storing a value of a disconnection monitoring timer held by the first network and a value of a disconnection monitoring timer held by the second network, in a network disconnection monitoring timer storage unit;
storing a value of a disconnection monitoring timer for monitoring both networks used for monitoring for inability to communicate RTP packets in both networks of the first network and the second network, in a disconnection monitoring timer storage unit;

setting the value of the disconnection monitoring timer for monitoring both networks to a value smaller than the value of the disconnection monitoring timer held by the first network and the value of the disconnection monitoring timer held by the second network;

controlling a signal transmitted and received between the first network and the second network; and monitoring for the inability to communicate the RTP packets in each of the first network and the second network, by using the disconnection monitoring timer for monitoring both networks, wherein, while controlling the signal, based on the disconnection monitoring termination apparatus detecting the inability to communicate RTP packets in one network having a larger value of the disconnection monitoring timer among the first network and the second network, a request in which a direction attribute of receive only is set is sent to the other network.

4. The disconnection monitoring termination apparatus of claim 1, wherein the signal is a session initiation protocol (SIP) signal or an RTP packet.

5. The disconnection monitoring termination apparatus of claim 1, wherein the signal control unit is configured to, based on an RTP packet being received, send an update request or a re-invite request including an SDP offer in which a direction attribute of send and receive is set, to the first network.

6. The disconnection monitoring method of claim 2, wherein the signal is a session initiation protocol (SIP) signal or an RTP packet.

7. The disconnection monitoring method of claim 2, further comprising, based on an RTP packet being received, sending an update request or a re-invite request including an SDP offer in which a direction attribute of send and receive is set, to the first network.

8. The disconnection monitoring method of claim 3, wherein the signal is a session initiation protocol (SIP) signal or an RTP packet.

9. The disconnection monitoring method of claim 3, further comprising, based on an RTP packet being received, sending an update request or a re-invite request including an SDP offer in which a direction attribute of send and receive is set, to the first network.

* * * * *